United States Patent Office 3,326,619
Patented June 20, 1967

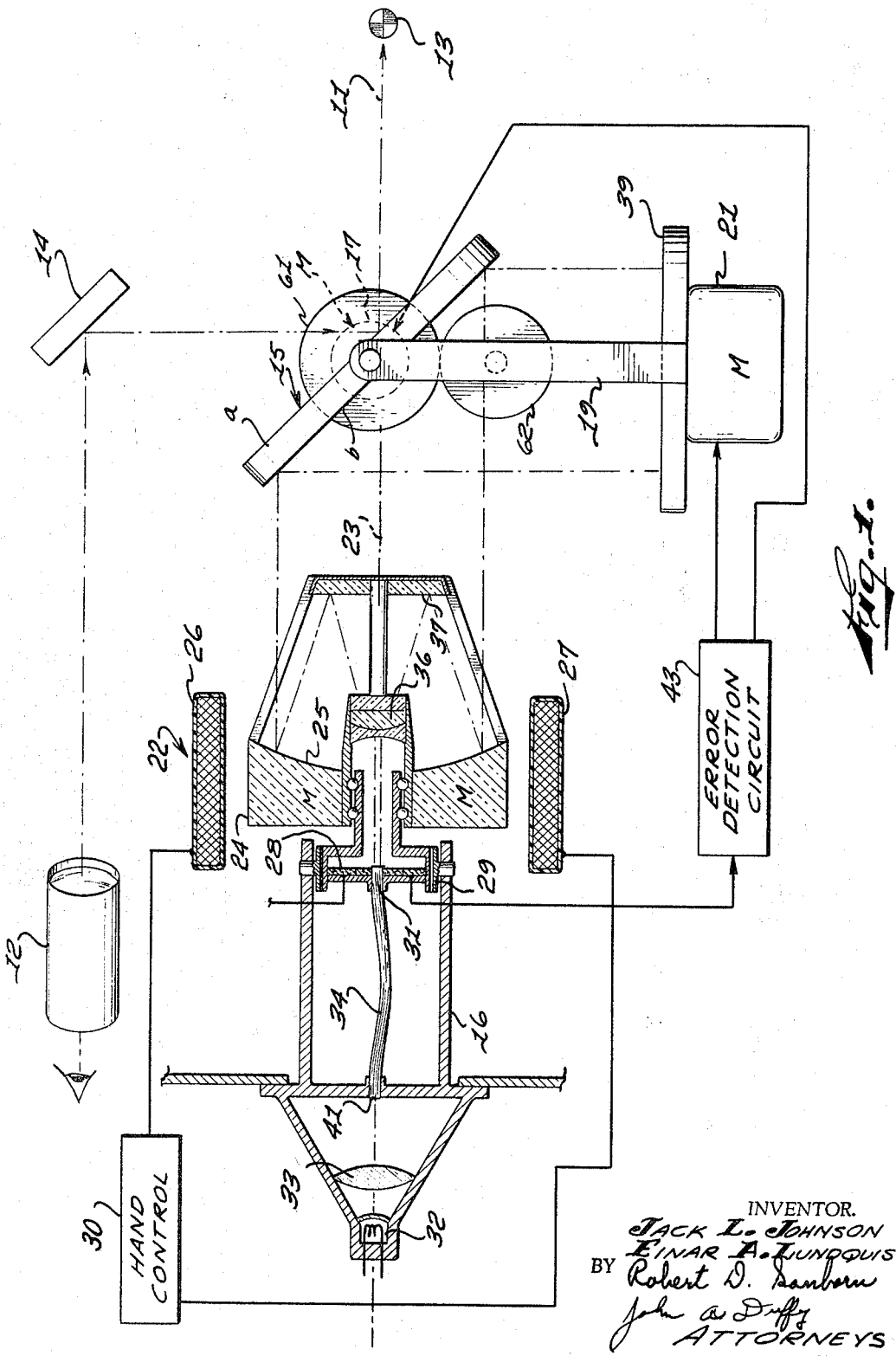

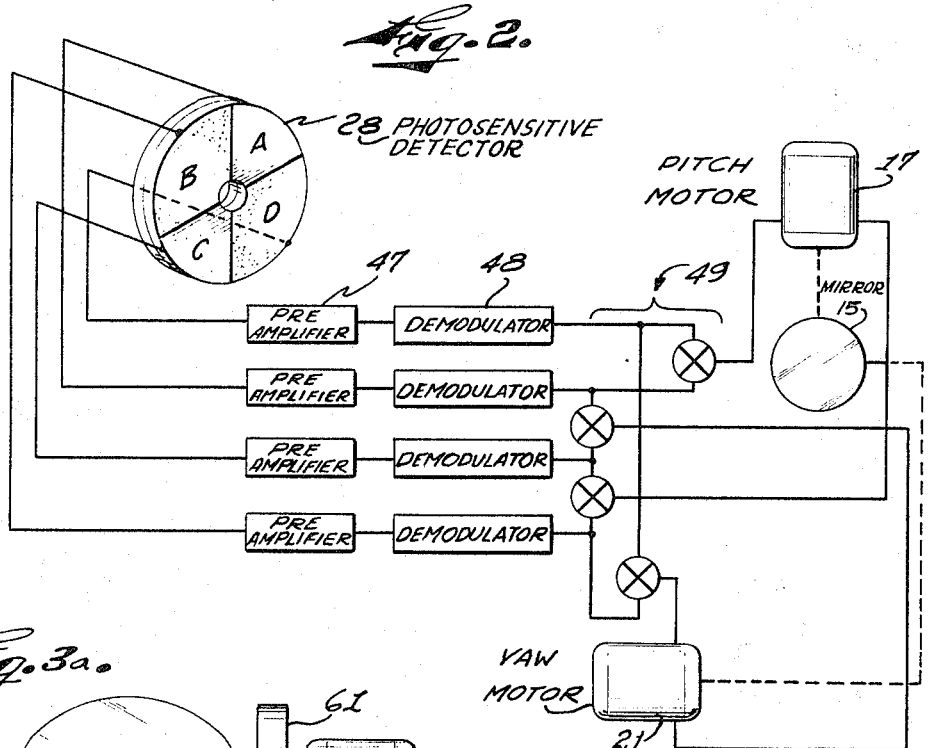
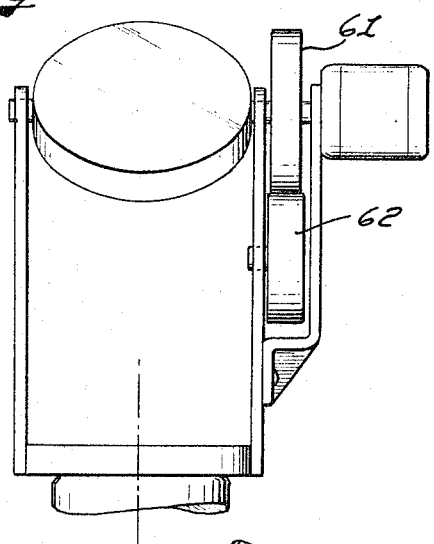
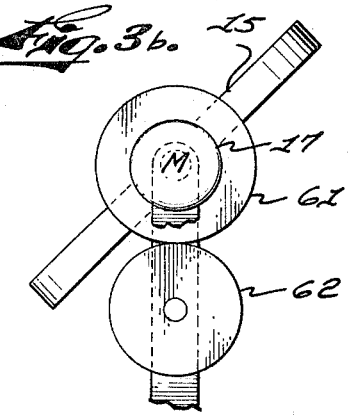
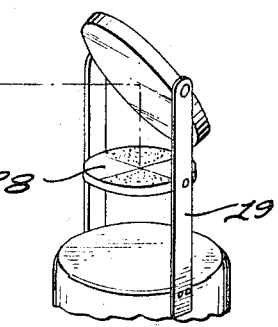

3,326,619
GYRO STABILIZED SIGHT SYSTEM UTILIZING A MIRROR WITH FRONT AND BACK REFLECTING SURFACES
Jack L. Johnson, Corona del Mar, and Einar A. Lundquist, Santa Ana, Calif., assignors, by mesne assignments, to Philco-Ford Corporation, a corporation of Delaware
Filed Oct. 7, 1963, Ser. No. 314,214
7 Claims. (Cl. 350—16)

This invention relates to optical sight systems and more particularly to a line of sight stabilizing system in which a sight line reflecting mirror is gyroscopically controlled to be stabilized about azimuth and elevation axes.

Conventional armament systems typically employ an optical sighting device such as a telescope or periscope in which a crosshair reticle is trained manually on a target. The center of the crosshairs of the sighting reticle are accurately aligned with an armament launch tube in order to insure that the launch tube will be aligned with the target prior to launch. Extreme accuracy is obtainable so long as the armament system is positioned on a fixed platform.

Advanced armament systems of the type wherein a missile is fired from a moving airborne vehicle or ground platform, require dynamic compensation to overcome the motions of the platform which supports the armament system. If, for example, the sighting device is mounted in an aircraft, motions such as pitch and yaw will affect the line of sight and must be compensated. In present guided missile armament systems, speedy and highly accurate correction of errors resulting from vehicle motions over a wide frequency range must be provided.

Prior art systems for correcting errors caused by platform motion have employed sight devices in which the optical sight is stabilized in space by a gyroscope. Such systems have been satisfactory when employed in armament systems which require a limited degree of accuracy. However, in present guided missile armament systems, the extreme accuracy of the guided missile demands such a high degree of stabilization against vehicle motions over such a wide frequency range as to make conventional stabilizing systems entirely unsatisfactory. Conventional mechanical transfer devices, such as gears and pulleys connected between the gyroscope and the sight system, impair the accuracy and timing of corrections to a degree not compatible with the accuracy of the guided missile. Further, in conventional systems position information is obtained from the gyroscope by magnetic pickoffs and the like, which introduce additional errors into the system.

Accordingly, it is an object of this invention to provide a gyroscopically-controlled line of sight stabilizing system of improved accuracy and frequency range.

The device of this invention overcomes the disadvantages of prior art devices by employing a gyroscopically-stabilized system which utilizes an optical path detection system which senses deviations of the line of sight from a gyro spin axis and which applies correction signals to the line of sight system without the use of a mechanical transfer system.

Extremely accurate measurement of the deviation of the line of sight from the gyro spin axis is obtained by the optical detection system; corrections are accurately and timely applied by an electrical servo system to the line of sight system.

It is therefore another object of this invention to provide a gyroscopically controlled optical sight system which utilizes an optical path system for detecting deviations of the line of sight from the gyro spin axis.

It is still another object of this invention to provide a gyroscopically controlled optical sight system in which the stabilizing gyro utilizes an optical detection system to provide signals to the optical sight system to correct for deviations in azimuth and elevation.

It is a further object of this invention to provide a gyroscopically controlled line of sight stabilizing system in which deviations caused by movement of the line of sight of the deflecting mirror with respect to the moving platform are measured by an optical path system which includes a deflecting mirror.

DRAWINGS

FIGURE 1 is a diagram in schematic and block form which illustrates a preferred embodiment of the gyro stabilized sight system.

FIGURE 2 is a schematic diagram which illustrates a detector and closed loop servo system which forms part of the system of FIG. 1.

FIGURES 3a and 3b illustrate a system for inertial balancing of the sight line deflecting mirror, and FIGURE 4 illustrates an alternative embodiment of the invention wherein an optical detector is mounted on the vehicle.

SUMMARY

According to a principal aspect of the invention, a gyro-stabilized sight system is provided within a vehicle for maintaining the line of sight system in correspondence in azimuth and elevation with the spin axis of the gyro. A sight line deflecting mirror movable with respect to the vehicle has a reflecting front surface disposed in the line of sight optical system. An optical path system for measuring displacement of the line of sight from the gyro spin axis is provided which includes a source of light disposed along the gyro spin axis and an autocollimating mirror. The reflecting back surface of the sight line deflecting mirror is disposed to project a collimated beam of light from the light source on the autocollimating mirror which reflects a return beam to an optical detector. The detector is disposed along the gyro spin axis and is mounted on the gyro for stabilization in space. The displacement of the return beam from the gyro spin axis is measured by the stabilized detector which provides azimuth and elevation error signals indicative of the deviation of the line of sight from the gyro spin axis. Closed loop servo means responsive to these deviation signals move the sight line deflecting mirror to correspond to the gyro spin axis.

According to another aspect of the invention, a balancing device is provided to balance inertially the sight line deflecting mirror statically and dynamically around each of its supporting gimbal axes.

FIGURE 1

FIG. 1 shows a stabilized line of sight system for controlling a line of sight 11 between a sighting telescope 12 and a target 13. The line of sight 11 is directed along an optical path from the telescope 12, to a reflecting mirror 14 and associated sighting (not shown), which are well known in the art, to a sight line deflecting mirror 15, and thence to the target 13. The mirror 14 and telescope 12 are fixed to the vehicle while mirror 15 is movable with respect thereto. Mirror 15 has a reflecting front surface $a$ in the optical path of the line of sight 11 and a reflecting back surface $b$ parallel to the front surface $a$. The sight line deflecting mirror 15 is mounted in a suitable frame which is pivoted about the elevation axis by means of a pair of shafts (not shown) which are driven by a pitch torque motor 17. The shafts for pivoting mirror 15 are journalled on the upper portion of a gimbal ring 19 which is mounted to the vehicle and journalled therein in a conventional manner for movement about the azimuth axis. A yaw motor 21 which is fixed to the vehicle rotates the gimbal ring 19 and the attached sight line deflecting mirror 15 about the azimuth axis.

The line of sight 11 is deflected by movement of the sight line deflecting mirror 15 about its azimuth and elevation axes; the line of sight will be stabilized in space by means of a system including a gyroscope 22 of a conventional two-axis type which provides stabilization in space about its spin axis 23. Gyroscope 22 has a housing 16 attached by suitable means to the vehicle platform. A gyro rotor 24 rotates about the spin axis 23. The rotor 24 has a primary mirror surface 25, a secondary mirror surface 37 and a negative lens assembly 36. Gyro 22 has a pair of precession coils 26 and 27 for torqueing the gyro 22 in accordance with a control 30 which may be, for example, operated by hand by the same operator who views the target 13 through the telescope 12. In this manner, the gyro spin axis 23 may be displaced in accordance with operator commands. An optical light path system is provided for detecting the deviation of the line of sight 11 from gyro spin axis 23 in order to develop correction signals for the pitch motor 17 and the yaw motor 21. The detection system includes a light detector 28 which is attached to an inner (yaw) gimbal 29 and which is stabilized by the gyro along the spin axis 23. Detector 28 is sensitive to light and comprises a plurality of separated surfaces. Detector 28 has a central opening 31 which passes light directed from a source 32 through a lens 33. Light source 32 and lens 33 are fixedly attached to the gyro housing 16. Source 32 projects a light beam through an opening 41 in the housing 16 to optical fibers 34 which direct the light beam through an opening 31 to the mirror system which includes negative lens 36, secondary reflecting mirror 37, and the primary mirror 25. The light beam is collimated by the mirror system and projected along axis 23 onto the back surface b of mirror 15. The collimated beam is reflected 90° by mirror 15 onto an autocollimation mirror 39 which is attached to gimbal 19 and is movable therewith about the azimuth axis. The return beam from the mirror 39 is again reflected 90° by surface b of mirror 15 and is focused on detector 28 by means of mirrors 25 and 37 and lens 36. Detector 28 is positioned to receive a slightly deformed image and provides electrical output signals to an error detection circuit 43; these signals indicate azimuth and elevation deviations of the line of sight 11 from the gyro spin axis 23. Circuit 43 provides signals to yaw motor 21 and pitch motor 17 which thereupon correct the orientation of mirror 15 in azimuth and elevation. In this manner the line of sight 11 presented to the eye of the viewer through telescope 12 corresponds to the gyro spin axis 23.

Since the front and back surfaces a and b of mirror 15 are parallel, orientation corrections of back surface b are transmitted to the front surface a to correct line of sight deviations. Deviations of the line of sight 11 in pitch occur in a two to one ratio to deflections of mirror 15. That is, for every degree of deviation of mirror 15, line of sight deviation is changed by two degrees. This two to one ratio is compensated for without additional special correcting means because back surface b of the mirror 15 is parallel to front surface thereof. Therefore the deviation of the light path reflected by the back surface b from the beam received by the detector 28 is an exact measurement of the deviation of the line of sight 11 from the gyro spin axis 23. In this manner, a stabilized gyro sight system is realized without the use of mechanical gears or pulleys.

The autocollimation technique, wherein the light beam is collimated by the optics of the gyro and is projected on autocollimation mirror 39 and is then returned to detector 28, provides a very high sensitivity to deviations of the line of sight 11 from the gyro spin axis 23.

The optical sight line of sight 11 may be readily displaced at the command of the operator by control 30 which torques the gyro 22 by means of precession coils 26 and 27. The resultant displacement of spin axis 23 will be sensed by detector 28 and mirror 15 will be controlled by the servo system to follow spin axis 23.

FIGURE 2

FIG. 2 is a schematic diagram of detector 28 and error detection circuit 43 of FIG. 1. Detector 28 is a quadrant detector having four separated surfaces, A, B, C, and D, which are sensitive to radiant energy from the autocollimated light beam described in FIG. 1. Detector 28 will sense changes in orientation of mirror 15 with respect to the gyro spin axis because detector 28 is stabilized along the spin axis and mirror 15 is attached to the vehicle. Therefore, vehicle motions cause the collimated light beam from the optical path detection system to be reflected from surface b of mirror 15 at an angle which creates an output from the detector 28. Signals from each of surfaces A, B, C, and D of detector 28 are fed to an amplitude modulation system which includes a pre-amplifier 47 and a demodulator 48 for each of the detector surfaces. The output of the demodulators is fed to summing means 49 which supplies a signal to the pitch motor 17; this signal is indicative of the elevation deviation of mirror 15 and therefore the deviation of line of sight axis 11 from gyro spin axis 23. Summing means 49 also supplies a signal to the yaw motor 19; this signal is indicative of the azimuth deviation of the line of sight axis 11 from the gyro spin axis 23. Detector 28 is placed at a slightly out of focus position so that when no deviation is encountered, the output of each of its segments will be the same and proportional to one-quarter of the spot energy of the light beam which is autocollimated on the detector 28. The detection system thus operates as a nulling closed-loop servo which eliminates linearity problems inherent in position slaving devices of the type where the servo loop operates at other than a zero position of two readout devices.

The stabilization system operates over wide frequency ranges in the region of 0 to 200 c.p.s. Sight line stabilization operates according to classical closed loop servo theory; that is, an error signal is generated and the mirror is torqued by the yaw and pitch torque motors in response to the error signal to cancel the error, thereby returning the system to a null position wherein the sight line axis will be coincident with the gyro spin axis.

FIGURES 3a and 3b

FIGS. 3a and 3b illustrate means for balancing both statically and dynamically the stabilizing mirror 15 around each of the gimbal axes. Balancing wheels 61 and 62 are mounted on a line parallel to the yaw axis. The balancing wheel 61 is mounted on the pitch axis and is fixedly attached to the stabilizing mirror 15. The balancing wheel 62 is mounted in rolling contact with the wheel 61 with bearing friction provided by thin steel crossed bands (not shown) which are connected to both wheels. When the vehicle platform moves through a given angle, each of the wheels 61 and 62 have the same radius and hence tends to rotate through the same angle, but in opposite directions, neglecting bearing friction. Wheel 62 has one-third the polar moment of inertia of the combined inertia of wheel 61 and mirror 15. Since wheels 61 and 62 are mounted in rolling contact, each motion counteracts the other and the stabilizing mirror 15 tends to remain fixed relative to the vehicle frame. Since wheel 61 and mirror 15 move through one-half the unity angular reference of the platform angle, torque balancing is achieved. In this manner inertial balancing of the stabilizing mirror is maintained during vehicle motions.

FIGURE 4

FIG. 4 illustrates an embodiment of the invention wherein detector 28 is mounted on the gimbal ring 19 rather than in the gyro. Light source 32 (in FIG. 1) projects a beam of light along gyro spin axis 23, which is collimated by the optical path system including the mirrors 25 and 37. The collimated light beam is reflected downwardly from the back surface *b* of mirror 15 and is detected by detector 28. Since the light beam is fixed in space along the gyro spin axis, vehicle motions will cause a displacement of the beam on detector 28, which will thereupon provide an output to detection circuit 43. Circuit 43 will actuate motors 17 and 21, thereby turning mirror 15 to a position at which the beam will be correctly centered on the detector and hence the direction of line of sight 11 will correspond to the gyro spin axis.

Although exemplary embodiments of the invention have been disclosed and discussed, it will be understood that other applications of the invention are possible and the embodiments disclosed may be subject to various changes, modifications, and substitutions without necessarily departing from the spirit of the invention.

We claim:

1. A sight system for maintaining a line of sight originating from a point on a movable platform trained at a point in space despite motion of said platform, comprising:
    (a) means for establishing a line of sight from said point on said platform to said point in space, said means including a mirror having reflecting front and back surfaces, said front surface being disposed to deflect the path of said line of sight,
    (b) means for providing a light beam, said beam being directed at said back surface of said mirror,
    (c) gyro means for maintaining the position of said beam stabilized in space,
    (d) detector means arranged to receive said beam after reflection from said back surface of said mirror and to provide an indication of the impinging position of said beam on said detector means, and
    (e) means for changing the orientation of said mirror with respect to said platform according to the indication provided by said detector means.

2. The system of claim 1 wherein said (e) means includes means for changing azimuth orientation of said mirror and means for changing the elevation orientation of said mirror.

3. The system of claim 1 wherein said (d) means comprises a photosensitive device having four separate segments, each of said segments arranged to supply an output indicative of the amplitude of light impinging thereon.

4. A sight system for a vehicle, comprising:
    (a) means for establishing a line of sight from a point on said vehicle to a point in space, said means including a mirror having first and second parallel surfaces, said first surface being disposed to deflect the path of said line of sight,
    (b) a yaw gimbal attached to said vehicle for supporting said mirror for movement about an azimuth axis,
    (c) a pitch gimbal attached to said vehicle for supporting said mirror for movement about an elevation axis,
    (d) means for providing a light beam, said beam being directed at said second surface of said mirror,
    (e) gyro means for maintaining the position of said beam stabilized in space,
    (f) detector means arranged to receive said beam after reflection from said second surface and to provide an indication of the impinging position of said beam on said detector means, and
    (g) means responsive to the output of said detector for rotating said yaw and pitch gimbals to correct the orientation of said mirror.

5. In a stabilized sight system, the combination comprising:
    (a) a mirror having parallel reflecting front and back surfaces,
    (b) a movable platform having means mounted thereon for supporting said mirror and allowing said mirror to rotate about azimuth and elevation axes thereof,
    (c) means for establishing a line of sight from a point fixed with respect to said platform to a point remote from said platform, said front surface of said mirror being disposed to deflect the path of said line of sight,
    (d) means for supplying a light beam and directing said beam at said back surface of said mirror,
    (e) gyro means for maintaining the position of said light beams stabilized in space despite motions of said platform, and
    (f) an optical detector comprising a plurality of four separate photosensitive surfaces, said surfaces being arranged about a point on said detector, said detector being positioned to receive a reflected image of said beam from said back surface of said mirror and to provide a signal indicative of the deviation of said beam impinging thereon from a symmetrical position with respect to said point on said detector.

6. The combination of claim 5 further including means, responsive to the signal provided by said detector when said beam impinges asymmetrically due to a movement of said platform, for adjusting the position of said mirror so that said beam impinges symmetrically on said detector, whereby said sight line will remain directed at said point in space despite said movement of said platform.

7. The system of claim 6 wherein said mirror is pivoted on yaw and pitch gimbals and wherein said means comprises yaw and pitch motors arranged to rotate said yaw and pitch gimbals, respectively, said detector being positioned in said yaw gimbal.

No references cited.

DAVID H. RUBIN, *Primary Examiner.*

T. H. KUSMER, *Assistant Examiner.*